United States Patent
Morton

(10) Patent No.: US 12,000,337 B2
(45) Date of Patent: Jun. 4, 2024

(54) BUSH

(71) Applicant: Cummins Ltd., London (GB)

(72) Inventor: Thomas Daniel Morton, Huddersfield (GB)

(73) Assignee: CUMMINS LTD, Huddersfield (GB)

( * ) Notice: Subject to any disclaimer, the term of this patent is extended or adjusted under 35 U.S.C. 154(b) by 70 days.

(21) Appl. No.: 17/614,274

(22) PCT Filed: May 24, 2019

(86) PCT No.: PCT/GB2019/051446
§ 371 (c)(1),
(2) Date: Nov. 24, 2021

(87) PCT Pub. No.: WO2020/240146
PCT Pub. Date: Dec. 3, 2020

(65) Prior Publication Data
US 2022/0220893 A1 Jul. 14, 2022

(51) Int. Cl.
| | | |
|---|---|---|
| *F02C 6/12* | (2006.01) | |
| *F01D 17/10* | (2006.01) | |
| *F02B 37/18* | (2006.01) | |
| *F02C 7/06* | (2006.01) | |

(52) U.S. Cl.
CPC ............. *F02C 6/12* (2013.01); *F02B 37/186* (2013.01); *F02C 7/06* (2013.01); *F01D 17/105* (2013.01); *F05D 2220/40* (2013.01); *F05D 2240/54* (2013.01); *F05D 2260/57* (2013.01)

(58) Field of Classification Search
CPC .. F02C 6/12; F02C 7/06; F02B 37/186; F01D 17/105; F05D 2220/40; F05D 2240/54; F05D 2260/57; Y02T 10/12
See application file for complete search history.

(56) References Cited

U.S. PATENT DOCUMENTS

| | | | |
|---|---|---|---|
| 4,628,874 A | 12/1986 | Barlow | |
| 9,546,597 B2 | 1/2017 | Swartz et al. | |
| 2014/0042802 A1 | 2/2014 | Dumitru | |
| 2016/0084163 A1 | 3/2016 | Swartz et al. | |
| 2018/0045105 A1* | 2/2018 | Tomanec | ................ F16C 17/00 |

FOREIGN PATENT DOCUMENTS

| | | | | |
|---|---|---|---|---|
| CN | 105143634 A | 12/2015 | | |
| DE | 3916221 A1 | 11/1990 | | |
| DE | 102014200721 A1 | 7/2015 | | |
| DE | 102017202961 A1 * | 8/2018 | ............. | B23P 11/00 |
| DE | 102017202961 A1 | 8/2018 | | |

OTHER PUBLICATIONS

International Search Report and Written Opinion for International patent application No. PCT/GB2019/051446, filed May 24, 2019, dated Jan. 23, 2020.
International Search Report and Written Opinion for International Patent Application No. PCT/GB2019/051446, filed Jan. 23, 2020.

* cited by examiner

*Primary Examiner* — Hoang M Nguyen
(74) *Attorney, Agent, or Firm* — Faegre Drinker Biddle & Reath LLP

(57) ABSTRACT

There is disclosed a bush comprising an internal surface and an external surface. The internal surface defines a bore and is configured to support movement of a body received in the bore. The external surface defines an outer radius. The external surface comprises one or more recesses.

20 Claims, 6 Drawing Sheets

BUSH

CROSS-REFERENCE TO RELATED APPLICATIONS

This application is a national phase application of International Application No. PCT/GB2019/051446 filed on May 24, 2019, which is incorporated herein by reference in its entirety.

FIELD OF THE DISCLOSURE

The present disclosure relates to a bush, an associated method of insertion and an associated method of manufacture. The present disclosure also relates to a bearing assembly, turbine housing assembly, turbocharger and valve assembly which incorporate the bush.

BACKGROUND

Turbochargers are well known devices for supplying air to the intake of an internal combustion engine at pressures above atmospheric pressure (boost pressures). A conventional turbocharger comprises an exhaust gas driven turbine wheel mounted on a rotatable shaft within turbine housing. Rotation of the turbine wheel rotates a compressor impeller mounted on the other end of the shaft within a compressor housing. The compressor impeller delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing.

Turbochargers typically incorporate a wastegate disposed in a turbine housing assembly. The wastegate provides a way of controlling the speed of the turbine wheel by selectively diverting an amount of exhaust gas away from the turbine wheel. Put another way, the wastegate selectively permits exhaust gas to bypass the turbine wheel, without being expanded thereacross. The wastegate is typically formed of a valve head mounted on a shaft, which is rotatable between open and closed positions. The open and closed positions allow and prevent, respectively, flow of exhaust gas through an associated bypass channel.

In order to permit rotation of the wastegate shaft, it is known to insert the shaft into a bush, the bush itself being inserted into a bore in the turbine housing.

There are a number of ways in which the bush may be retained within the bore in the turbine housing. These include, to name but some examples, welding, brazing, the use of pins, and the use of a shouldered bush. However, despite using the aforementioned methods and features, the bush can still become loose in the bore of the turbine housing, and relative movement therebetween can occur. This relative movement can lead to inefficient operation of the wastegate and, more generally, the entire turbocharger. Inefficient operation of the wastegate can take the form of, for example, ineffective sealing and/or inhibited movement.

It is an object of the present disclosure to overcome the disadvantages associated with existing bush retention methods.

SUMMARY

According to a first aspect of the disclosure there is provided a bush comprising an internal surface and an external surface;

a. wherein the internal surface defines a bore and is configured to support movement of a body received in the bore;
b. wherein the external surface defines an outer radius; and
c. wherein the external surface comprises one or more recesses.

The internal surface may be a substantially continuous, and relatively smooth, surface.

The outer radius refers to a radius which would be required for the bush to be inserted in a corresponding bush-receiving bore such that the outer radius be flush with the bush-receiving bore (i.e. not taking into account any interference resulting from an interference fit or similar). The outer radius is not intended to refer to any external projecting feature, such as a shoulder in the case of a shouldered bush.

The recesses may be cavities, grooves, trenches, indentations, blind bores, radially undercut features and/or other subsurface engagement feature. The one or recesses may be annular.

The internal surface may be configured to support rotation and/or linear movement of a body received in the bore. The body may be a rotatable body. The support of movement may otherwise be referred to as guiding movement. That is to say, the bush provides the internal surface which somehow constrains movement of the body.

The one or more recesses may be configured to receive material of a bush housing.

The one or more recesses advantageously provide an anchoring functionality. In other words, when material of the bush housing is deformed therein, the bush is more robustly held in place, or retained. The bush housing material may be said to bite into, or engage, the one or more recesses. This advantage is particularly pronounced in high temperature operation, whereby the bush may expand to a different extent to that of a surrounding bush housing.

All of the one or more recesses may be configured to receive material of the bush housing deformed therein. At least one of the one or more recesses is advantageously configured to receive material of the bush housing deformed therein. An anchoring effect, or functionality, is thereby provided.

The one or more recesses may comprise one or more of an annular recess, an axial recess, a helical recess, knurling or other indented geometry.

Axial recess is intended to mean an axially extending recess. In other words, a linear, or substantially linear, groove which extends in an axial direction. The axial recess may extent along an entire axial extent of the external surface, or a portion thereof.

A helical recess is intended to mean a recess with a helical geometry. An example of a helical geometry is that of a screw thread.

The knurling may, for example, be a straight or diamond pattern. That is to say, the knurling may substantially align with the axis of the bush, or may be disposed at relative angle thereto. The relative angle is preferably around 45°.

A recess which is, in use, at least partially disposed within the bush-receiving bore and at least partly filled with swaged material may prevent movement of the bush in all directions, thereby removing all degrees of freedom.

The one or more recesses may be a plurality of annular recesses.

The plurality of annular recesses may be described as a series, or set, of annular recesses. Alternatively, the plurality of annular recesses may be described as an array of annular recesses.

The plurality of annular recesses may be a repeating pattern i.e. each of the recesses may share the same geometry. The recesses may be distributed across the external surface, or only occupy a portion thereof. Each of the recesses may be spaced apart from one another by the same axial extent. Alternatively, the recesses may be spaced apart from one another by a varying axial extent e.g. there may be a smaller or larger offset between different adjacent/consecutive recesses.

The one or more recesses may span an entire axial extent of the external surface.

The one or more recesses may alternatively span only a portion of the entire axial extent of the external surface. For example, the one or more recesses may only, or at least, span a portion of the axial extent in the vicinity of a contact face of a bush housing. This may be desirable in that the material of the bush housing in the vicinity of the contact face may deform to a greatest extent. This may result in the bush being more securely retained within the bush housing due to the deformation of bush housing material into the one or more recesses. The one or more recesses may span at least an outer end of the bush. Outer end may mean an end portion of the bush in proximity to a contact face of the bush housing. The end portion may extend up to around 20% of the overall axial length of the bush.

The one or more recesses may be recessed to a radial depth of at least around 0.04 mm relative to the outer radius.

The one or more recesses are preferably recessed to a radial depth of at least around 0.2 mm. Radial depth is intended to refer to the distance between a radially innermost surface of the recess and the outer radius of the bush. The 0.2 mm lower limit is particularly advantageous when used with a 14 mm OD bush made of T400, in a D5S bush housing, which operates at temperatures of around 850° C.

The one or more recesses may be recessed to a depth common to all of the one or more recesses. Alternatively, the one or more recesses may be recessed to varying depths. In other words, the one or more recesses may have a uniform, or non-uniform depth.

The one or more recesses are preferably recessed to a depth sufficient to enable material of the bush housing, which is deformed therein, to engage at least one of the recesses and thereby anchor the bush in position.

An entire axial extent of the bush may be between around 15 mm and around 100 mm.

Entire axial extent may otherwise be referred to as the length of the bush. Put another way, the entire axial extent, or length, of the bush is the end to end distance thereof.

In preferred arrangements, the bush is elongate. That is to say, the bush has a greater axial extent than diametrical extent. Put another way, the bush is longer than it is wide. The shape of the bush may therefore be a tube or, more broadly, tube-like. However, in alternative arrangements, the bush may be comparatively shorter, or stub-like. In such arrangements, the bush may resemble a ring in shape.

The outer radius may be between around 5 mm and around 10 mm.

The outer radius is preferably around 7 mm or around 8 mm.

According to a second aspect of the disclosure there is provided a turbine housing assembly comprising a turbine housing and the bush according to the first aspect of the disclosure, wherein the turbine housing incorporates a bush housing having a bush-receiving bore, and wherein the bush is at least partially received in the bush-receiving bore.

The bush housing may otherwise be referred to as a bush boss.

The bush being at least partially received in the bush-receiving bore is intended to mean that the entire bush, or just a portion thereof, may be received in the bush-receiving bore. Received in may otherwise be described as inserted therein, or disposed within.

The bush-receiving bore may be a through bore. Alternatively, the bush-receiving bore may be a blind bore.

The bush-receiving bore is so called in order to differentiate between the bore in which the bush is received and the bore which is defined by the internal surface of the bush. As such, the bush-receiving bore may otherwise be referred to simply as a bore.

In preferred arrangements, the bush-receiving bore is axially shorter than the length of the bush. As such, the bush projects, or protrudes, from the bush-receiving bore. Preferably, the bush projects from both ends of the bush-receiving bore. In such embodiments, a face of the bush can be used as a seal and thrust face i.e. other components can abut the face. Alternatively, one or both ends of the bush may be retained within the bush-receiving bore. In such instances, and where the bush forms part of wastegate assembly, a valve and lever assembly could be modified to interface with the bush within the bush-receiving bore.

According to a third aspect of the disclosure there is provided a bearing assembly comprising the bush according to the first aspect of the disclosure and a rotatable body received in the bore.

The bearing assembly may be that of a plain bearing, roller bearing or thrust bearing, to name just some examples. The plain bearing may be a journal bearing.

Where the bearing assembly is a plain bearing, the rotatable body may be a shaft. In instances where the bearing assembly is a roller bearing or a thrust bearing, the rotatable body may be a race and/or rolling elements such as balls or cylinders. The race may be an inner race. The bush may be, or form part of, an outer race. Rolling elements, such as balls or cylinders, or some other body, may interpose the bush and the inner race. Rolling elements may otherwise be referred to as bearing elements. Alternatively, or in combination, a layer or film of lubricant may also interpose the bush and the internal surface, particularly relevant for a plain bearing. The races referred to above may otherwise be referred to as rings, or cylinders.

In any variety of bearing assembly, the rotatable body may be a shaft.

According to a fourth aspect of the disclosure there is provided a turbine housing assembly comprising a turbine housing and the bearing assembly according to the third aspect of the disclosure, wherein the turbine housing incorporates a bush housing having a bush-receiving bore, and wherein the bearing assembly is at least partially received in the bush-receiving bore, and wherein the rotatable body is a shaft which forms part of a wastegate.

The shaft may be part of a wastegate such that the shaft is connected, directly or indirectly, to a valve head. The shaft may support rotation of the wastegate. Said rotation of the wastegate may permit the wastegate to move between open and closed positions, or configurations. The shaft may therefore enable the wastegate to pivot between open and closed positions.

The turbine housing assembly may form part of a turbocharger. Alternatively, the turbine housing assembly may form part of a power turbine. In particular, the turbine housing assembly may form part of a high temperature natural gas turbine.

The turbine housing may be manufactured from D5S or HK30.

According to a fifth aspect of the disclosure there is provided a turbocharger comprising:
  a. a compressor comprising a compressor housing and a compressor impeller;
  b. a turbine comprising a turbine wheel and the turbine housing assembly of either the second or fourth aspects of the disclosure; and
  c. a shaft connected to both the compressor impeller and the turbine wheel, such that rotation of the turbine wheel is configured to drive rotation of the compressor impeller.

The turbine may be a dual-inlet or twin-volute turbine. Alternatively, the turbine may be a single-inlet turbine. The turbine wheel may be referred to as a turbine impeller.

The turbine may be fixed geometry. Alternatively, the turbine may be a variable geometry turbine.

The turbocharger may be for an engine arrangement. The engine arrangement may form part of an automotive vehicle such as an automobile. More specifically, the vehicle may be a car or a truck. The engine arrangement may be an internal combustion engine. The turbocharger may be disposed in an automotive vehicle, a ship, a locomotive or other type of vehicle. Alternatively, the engine arrangement may form part of a static engine such as, for example, a generator or pump.

The internal combustion engine may be a gasoline (i.e. petrol), gas or diesel engine. Specifically, the diesel engine may be a high temperature diesel engine in which a turbine inlet reaches temperatures in excess of 700° C.

According to a sixth aspect of the disclosure there is provide a valve assembly comprising the bush according to the first aspect of the disclosure.

The valve assembly may be, or form part of, an exhaust brake valve, exhaust gas recirculation (EGR) valve or a butterfly valve, such as a throttle valve.

Advantageously the valve assembly is for use in a high temperature environment, such as in an exhaust gas stream, or flow. Temperatures in excess of around 700° C. are examples of high temperature environments.

The valve assembly may be for an engine arrangement. The engine arrangement may form part of an automotive vehicle such as an automobile. More specifically, the vehicle may be a car or a truck. The engine arrangement may be an internal combustion engine. The valve assembly may be disposed in an automotive vehicle, a ship, a locomotive or other type of vehicle. Alternatively, the engine arrangement may form part of a static engine such as, for example, a generator or pump.

According to a seventh aspect of the disclosure there is provided a method of inserting the bush according to the first aspect of the disclosure into a bush housing, the method comprising the steps of:
  i) aligning the bush with a bush-receiving bore of the bush housing; and
  ii) urging the bush into the bush-receiving bore.

The method may further comprise the step of applying a compressive force to the bush housing to compress the bush housing and thereby plastically deform the bush housing in the locality of the one or more recesses such that material of the bush housing is at least partially received in the one or more recesses of the bush.

Advantageously the bush is thereby secured within the bush-receiving bore of the bush housing.

The plastic deformation may be by way of staking or swaging. Alternatively, any other process in which a load is applied, such that the bush housing is plastically deformed as a result, may be used.

The bush housing being plastically deformed in the locality of the one or more recesses is intended to mean that the force is applied sufficiently proximal the one or more recesses that surrounding material of the bush housing deforms into the one or more recesses.

The force may be applied axially, substantially axially or at some other angle i.e. at 45° to the axis. Alternatively, or in combination, the force may be applied radially, or substantially radially.

The force may be applied in a single operation. Alternatively, the force may be applied in a plurality of operations. The force may be applied using a punch. The force may be applied through a single projection on the punch. Alternatively, the force may be applied through a plurality of projections on the punch.

The projection(s) may be said to provide a point load. In other words, a concentrated load in a specific area. This is advantageous in being able to more accurately control where the deformation of the bush housing occurs. Where a plurality of projections is disposed on the punch, they may be distributed in an array. The distribution may be circumferential, i.e. about points on a circumference of a circle. Alternatively, or in combination, the distribution may be axial, i.e. along a length of a cylinder.

The plurality of projections may be evenly distributed in the array. For example, in preferred arrangements, the punch incorporates three projections. The three projections are circumferentially distributed at a common radius, and at angular separations of around 120°. It will be appreciated that, for a circumferential distribution of projections, the radius at which the projections are disposed, relative to the axis, will be greater than the radius of the bush-receiving bore. The radius of the circumferential distribution of projections may be, for example, between around 2 mm to around 3 mm greater than the radius of the bush-receiving bore. The projections may be created by a punch having a geometry of around 1 mm by around 3 mm.

The projection(s) may be rectangular or circular, to provide two geometry examples. Where the projection(s) is rectangular, the cross-section of the projection may be around 1 mm by around 3 mm. Where the projection is circular, the diameter may be around 1.95 mm$^2$ to around 3 mm$^2$. The projections may be displaced to a depth of up to around 1.5 mm, preferably around 1 mm, during staking. The position of the projection(s) may be around 1 mm, 2 mm or 3 mm from the bush-receiving bore, applied to a contact face of the bush housing. The projections may incorporate a draft (i.e. be tapered). A variety of geometries of projection, and indentation, may be possible.

Where material is plastically deformed, the overall method of insertion may be referred to as a method of insertion and securing, restraining or anchoring.

According to an eighth aspect of the disclosure there is provide a method of inserting a bush into a bush housing, the method comprising the steps of:
  i) aligning the bush with a bush-receiving bore of the bush housing;
  ii) urging the bush into the bush-receiving bore such that one or more recesses in an external surface of the bush are disposed within the bush-receiving bore; and iii) applying a compressive force to compress the bush housing such that the bush housing is plastically deformed in the locality of the one or more recesses and the plastically deformed material thereby engages the one or more recesses.

The bush is thereby advantageously anchored within the bush housing.

Plastic deformation is intended to mean permanent deformation. In other words, the material is deformed beyond its elastic limit.

The bush housing being plastically deformed in the locality of the one or more recesses is intended to mean that the force is applied sufficiently proximal the one or more recesses that surrounding material of the bush housing deforms into the one or more recesses. The deformation of material may be referred to as extrusion of material.

The entire bush housing may be compressed, or just a portion, or portions, thereof. In particular, where a plurality of projections is used to transmit the compressive force, the bush housing may only be compressed in the regions contacted by the plurality of projections.

Axial is intended to refer to a direction along an axis defined by the bush. In other words, the direction along an axis of rotation of a rotatable body received in the bush.

Compressive force is intended to mean a force which deforms the bush housing so as to reduce an extent of the bush housing it in at least one dimension. The compressive force may otherwise be described as a force which is applied substantially in the direction of a centrepoint of the bush-receiving bore. The centrepoint refers to a location which is both substantially radially central, and substantially axially central, in the bush-receiving bore.

The application of force may be by a punch.

The punch may be translated by a press. The press may be, for example, a 2.5 tonne press (able to transmit forces of up to around 25 kN). The punch may incorporate one or more projections. Force may be transmitted through the one or more projections.

The application of force to compress the bush housing may be in a substantially axial direction.

The application of force in a substantially axial direction may lead to plastic deformation of the bush housing in a substantially radial direction.

The force may be applied to an external surface of the bush housing.

The external surface may otherwise be described as an external end, an exposed end, or an end of the bush housing.

The application of force to compress the bush housing may be in a substantially radial direction.

The application of force in a substantially radial direction may lead to plastic deformation of the bush housing in a substantially radial direction.

The force may be applied along an axial length of the bush housing.

The force may be applied at one or more positions along the axial length of the bush housing.

The force may be applied by a staking process.

Staking may refer to a manufacturing process in which a component is axially compressed in order to expand it radially. This can form an interference fit between the component and a subsidiary component. Staking may also refer to a manufacturing process in which, more generally, a component is deformed to form an interference fit between the component and a subsidiary component.

Staking may occur by way of a punch and a die. The die may support the component. The punch may transmit the force.

In preferred arrangements, an opposing end of the bush housing is supported by a die, whilst a punch applies a force upon an exposed surface of the bush housing in a staking process.

According to a ninth aspect of the disclosure there is provided a method of manufacturing a bush, the method comprising the step of:
i) removing material from an external surface of the bush by a machining process to create one or more recesses in the external surface.

Creating the one or more recesses by a machining process is advantageous in that a standard bush can be modified to incorporate the one or more recesses. Furthermore, the one or more recesses can be created using existing machining processes during the manufacture of the bush.

The machining process may be turning or milling. Turning may include boring. The machining process may be a grinding process.

Creating the one or more recesses by turning is particularly advantageous in that the external surface of the bush is worked on a lathe in order to ensure the outer radius conforms to tolerance requirements for insertion into the bush-receiving bore. As such, the bushes used in existing practices will typically be mounted on a lathe anyway. Whilst the creation of the one or more recesses represents an extra manufacturing step, no special tooling is required, and the bush need not be mounted on a lathe solely for the purpose of creating the one or more recesses. Where the one or more recesses are created by turning, the one or more recesses can therefore be integrated into existing bush manufacturing and finishing processes.

According to a tenth aspect of the disclosure there is provided an assembly comprising a bush received in a bush-receiving bore of a bush housing, the assembly being obtained by the method of:
i) aligning the bush with the bush-receiving bore;
ii) urging the bush into the bush-receiving bore such that one or more recesses in an external surface of the bush are disposed within the bush-receiving bore; and
iii) applying a compressive force to compress the bush housing such that the bush housing is plastically deformed in the locality of the one or more recesses and the plastically deformed material thereby engages the one or more recesses;
b. wherein the bush housing comprises one or more indentations in an external surface of the bush housing, the one or more indentations being formed during step (iii).

The optional and/or preferred features for each aspect of the disclosure set out above are also applicable to any other aspects of the disclosure, where appropriate.

BRIEF DESCRIPTION OF THE DRAWINGS

Specific embodiments of the present disclosure will now be described, by way of example only, with reference to the accompanying drawings in which.

DETAILED DESCRIPTION OF EMBODIMENTS OF THE DISCLOSURE

Figure 1:
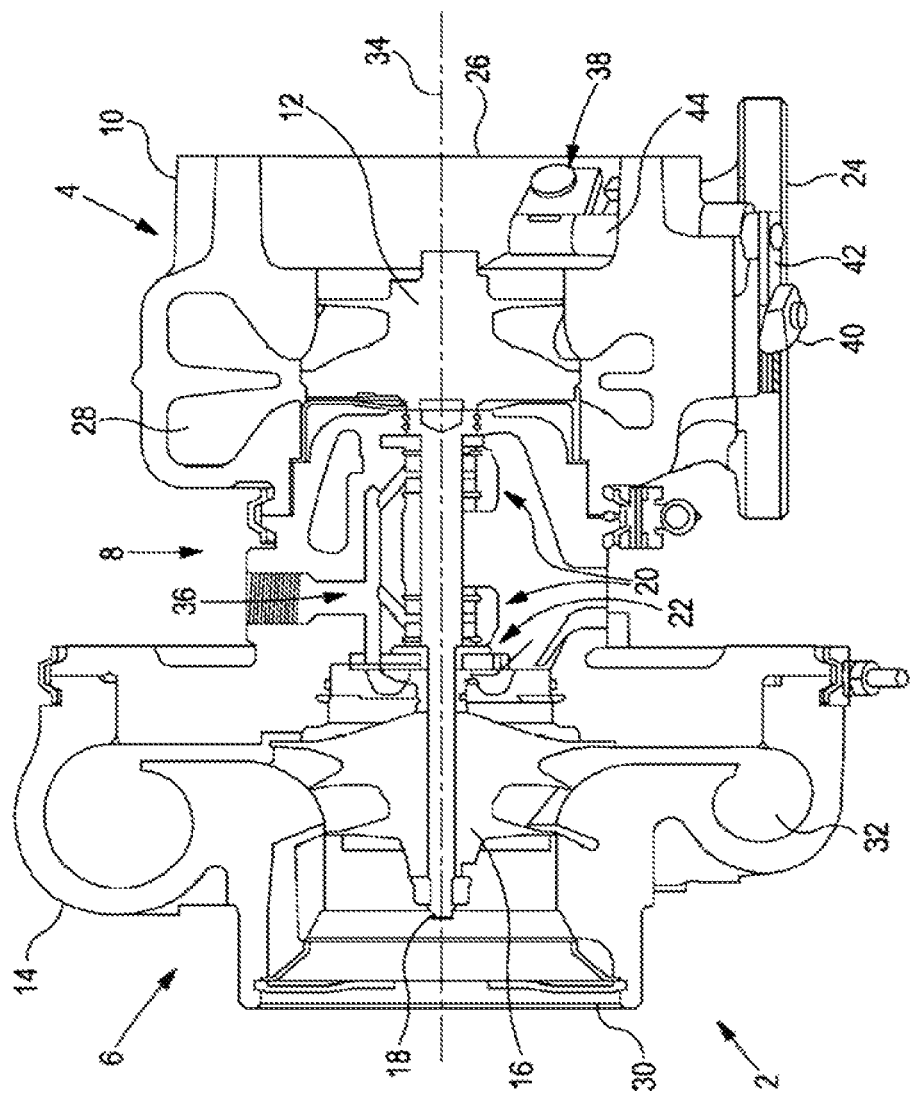
FIG. 1 is a cross-sectional side view of a turbocharger which may incorporate a bush according to an embodiment of the disclosure.

Referring to FIG. 1, a cross-sectional side view of a turbocharger 2 is shown. The turbocharger 2 comprises a turbine 4 joined to a compressor 6 via a bearing housing 8. The turbine 4 comprises a turbine housing 10 and a turbine wheel 12. Of note, throughout this document the turbine housing assembly is intended to refer to the turbine housing 10 and at least one other feature. This will be explained in detail below.

The compressor 6 comprises a compressor housing 14 and a compressor impeller 16. The turbine wheel 12 is mounted on an opposite end of a shaft 18 to the compressor impeller 16. The shaft 18 is supported on roller bearing assemblies 20 and a thrust bearing assembly 22 within the bearing housing 8. The roller bearing assemblies 20 support a predominantly rotational load whilst the thrust bearing assembly 22 supports a predominantly axial load. Although a fixed geometry turbocharger is shown in FIG. 1, the disclosure is equally applicable to a variable geometry turbocharger.

The turbine housing 10 is provided with an exhaust gas inlet 24 and an exhaust gas outlet 26. The exhaust gas inlet 24 directs incoming exhaust gas to a turbine inlet chamber 28 surrounding the turbine wheel 12. The turbine inlet chamber 28 may be annular. The exhaust gas flows through the turbine 4 and out of the exhaust gas outlet 26 via a circular outlet opening which may be coaxial with the turbine wheel 12. Rotation of the turbine wheel 12 rotates the compressor impeller 18 which draws in air through an axial inlet 30 and delivers compressed air to the engine intake via an annular outlet volute 32. The turbine wheel 12, shaft 18 and compressor impeller 16 are coaxial and rotate about a turbocharger axis 34.

The bearing housing 8 provides a lubricating system for the turbocharger assembly. The bearing housing 8 includes a series of channels 36 through which oil is supplied to the roller bearing assemblies 20 and thrust bearing assembly 22. Journal bearings may also, or alternatively, be incorporated in the bearing housing 8. The channels 36 receive oil from an engine oil circuit (not shown).

The turbocharger 2 also includes a wastegate 38 (which will be described in more detail below). The wastegate 38, as mentioned above, is used to control the speed of the turbine wheel 12 by selectively directing a proportion of the exhaust gas from the turbine inlet chamber 28 to the exhaust gas outlet 26, before it is expanded across the turbine wheel 12. In other words, the wastegate 38 can permit some exhaust gas to be exhausted without being expanded across, and therefore driving rotation of, the turbine wheel 12. The wastegate 38 therefore provides a bypass function, allowing exhaust gases to bypass the turbine wheel 12. Because the turbine wheel 12 is mounted to the same shaft 18 as the compressor impeller 16, the wastegate 38 therefore also allows the rotational speed of the compressor impeller 16, and therefore the boost pressure generated thereby, to be controlled.

The rotational position of the wastegate 38 is controlled by an actuator (not shown). The actuator position may be determined by a controller (also not shown). The actuator may be an electric motor or, alternatively, may be hydraulic or pneumatic.

The actuator controls the rotational position of the wastegate 38 by actuating linkages 40, 42 which open or close the wastegate 38. The linkages 40, 42 may form part of a four-bar linkage.

Also visible in FIG. 1 is a bush 44 into which the wastegate 38 is inserted. The bush 44 is inserted in a bush-receiving bore of a bush housing of the turbine housing 10. In other words, the bush housing is defined as part of the turbine housing 10, and the bush-receiving bore is disposed in the bush housing. The bush 44 could also be described as being inserted into the turbine housing 10, specifically a bush-receiving bore thereof.

Figure 2:
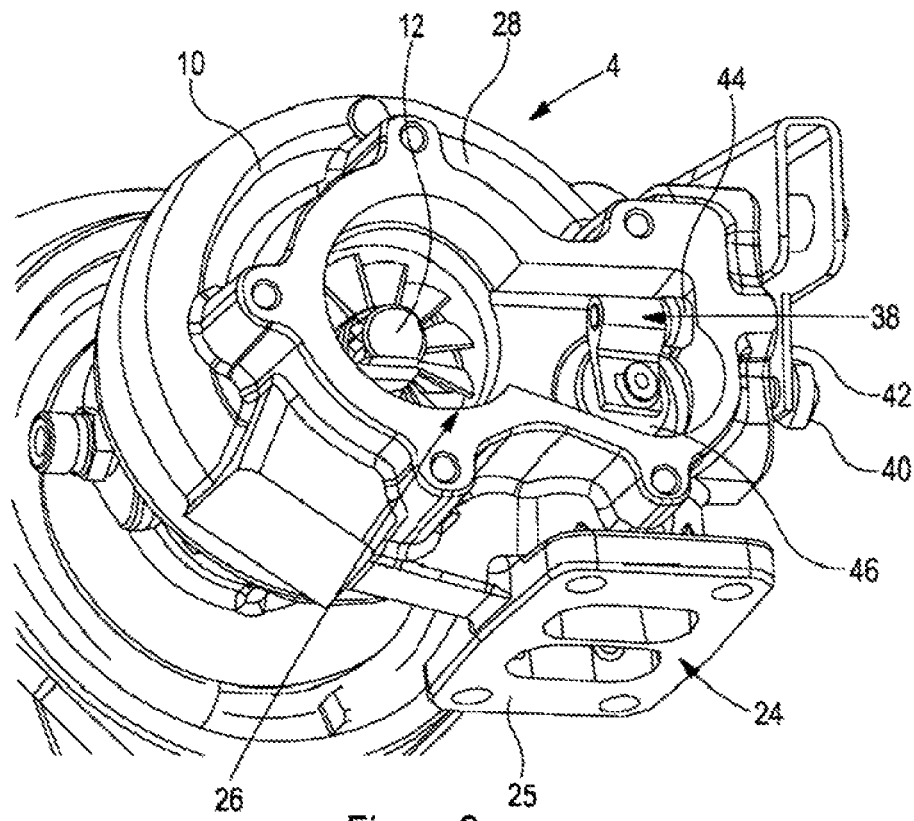
FIG. 2 is a perspective view of the turbocharger of FIG. 1, illustrating the relative position of the wastegate in the turbine housing.

FIG. 2 is a perspective view of the turbine end of the turbocharger 2 of FIG. 1. More dearly visible in FIG. 2 is the position of the wastegate 38 within the turbine housing 10.

As mentioned above, rotation of the wastegate 38 between an open and closed position (the closed position being shown in FIG. 2) permits or substantially prevents exhaust gas from bypassing the turbine wheel 12 and being exhausted through the exhaust gas outlet 26. Also visible in FIG. 2 is the bush 44 into which the wastegate 38 is seated. The wastegate 38 may otherwise be said to be housed in the bush 44.

A valve head 46 is also illustrated, the valve head 46 forming part of the wastegate 38. Although not shown in FIG. 2, it will be appreciated that the valve head 46 selectively permits fluid communication between the turbine inlet chamber 28 and the exhaust gas outlet 26 whilst bypassing the turbine wheel 12. As such, the valve head 46, in the position shown in FIG. 2, seals a channel which provides fluid communication between the turbine inlet chamber 28 and the exhaust gas outlet 26.

The exhaust gas inlet 24 and corresponding attachment flange 25 are also shown in FIG. 2.

It will be appreciated from FIG. 2 that the wastegate 38 is constrained by the bush 44. That is to say, the bush 44 guides rotation and limits axial movement of the wastegate 38, specifically the valve head 46 thereof. Movement of the bush 44 from its intended positon can therefore lead to misalignment of the wastegate 38, and so the valve head 46. This can, in turn, lead to issues such as low boost pressures, binding of the linkages 40, 42 (i.e. jamming of the linkages) and generally poor control, all resulting in reduced performance of the turbocharger. Binding of the linkages 40, 42 refers to instances whereby the linkages 40, 42 may abut an exterior, or exterior, of the turbine housing 10, thereby preventing the full range of motion of the wastegate 38 and risking damage to the exterior of the turbine housing 10. A further effect of movement of the bush 44 is that the valve head 46 can move away from a corresponding valve seat (not shown) of the turbine housing 10. That is to say, the valve head 46, and so wastegate 38, may no longer substantially seal the valve seat to prevent leakage of exhaust gas therethrough. It will be appreciated that said movement is only a problem when the wastegate 38 is in a closed configuration, or position, whereby no exhaust gas should be able to pass thereby.

Figure 3:
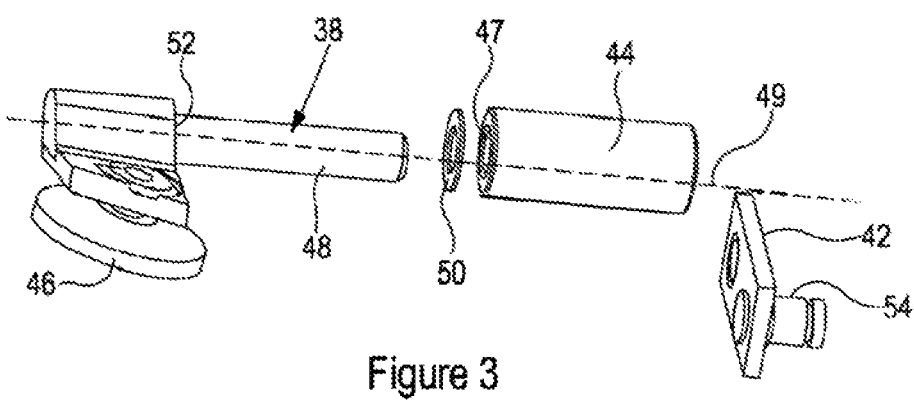
FIG. 3 is an exploded perspective view of a wastegate assembly as illustrated in FIGS. 2 and 3.

FIG. 3 is an exploded perspective view of the wastegate 38 and bush 44, among other components.

The wastegate 38 comprises the valve head 46 and a shaft 48. The shaft 48 is cylindrical and allows for rotation of the valve head 46 about axis 49. FIG. 3 also indicates how the shaft 48 is received within the bush 44, specifically a bore 47 defined therein. It will be appreciated that when the wastegate 38, specifically the shaft 48 thereof, is received in the bore 47 of the bush 44, the wastegate 38 can rotate about the axis 49 as constrained by the bush 44. The axis 49, about which the wastegate 38 rotates, may otherwise be referred to as a wastegate axis. The wastegate axis is different to that of the axis about which the shaft, turbine wheel and compressor impellers rotate.

A shim 50 is also illustrated and is disposed between an end of the bush 44 and valve head mount 52 of the wastegate 38. The shim 50 substantially prevents exhaust gas from escaping the turbine housing 10 through the bush 44, specifically the bore 47 thereof.

When the components of FIG. 3 are assembled, a distal end of the shaft 48, relative to the valve head 46, is connected to the linkage 42. As such, rotation of the linkage 42 causes rotation of the shaft 48, and so valve head 46. The linkage 42 incorporates a stub 54 which is connected to the other linkage (labelled 40 in FIGS. 1 and 2).

As mentioned previously, the bush 44 provides a guiding surface about which the shaft 48, and so the wastegate 38, can rotate. Furthermore, the bush 44 provides an axial alignment by virtue of the shim 50 being sandwiched between valve head mount 52 and the proximal end of the bush 44. The bush 44 can therefore constrain axial movement of the wastegate 38 in both directions.

Axial movement of the bush 44 relative to the turbine housing 10 can lead to misalignment of the wastegate 38 and so valve head 46.

The applicant has devised a bush which is modified so as to be more reliably retained in the correct position in the turbine housing 10.

Figure 4:
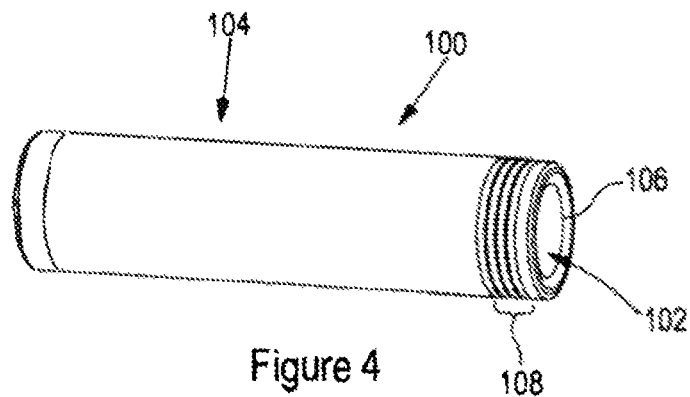
FIG. 4 is a perspective view of a bush according to an embodiment of the disclosure.

FIG. 4 shows a bush 100 according to a first aspect of the disclosure. Bush 100 is, in use, inserted in a bush-receiving bore. However, in FIG. 4 the bush 100 is shown in isolation.

The bush 100 comprises an internal surface 102 and an external surface 104.

The internal surface 102 defines a bore 106. The bore 106 is configured to support rotation of a rotatable body received therein. The rotatable body may be a shaft, a rolling member or an inner race of a bearing, to name just some examples.

The external surface 104 defines an outer radius of the bush 100. The external surface 104 comprises a plurality of recesses, indicated generally by reference numeral 108.

In the illustrated embodiment, the plurality of recesses 108 refers to four annular recesses, or grooves. However, many other arrangements and orientations of recesses are possible, and these will be described in greater detail below.

The external surface 104 is configured to engage the bush housing. Specifically, the external surface 104 is configured to engage a bush-receiving bore disposed in the bush housing. It will be appreciated that, depending upon the extent to which the bush 100 is inserted within the bush-receiving bore, some, most of, or all of the external surface 104 may engage the bush housing. That is to say, the bush 100 may be inserted to a range of axial depths within the bush-receiving bore, and so bush housing.

In a particularly advantageous embodiment, the bush 100 is inserted in the bush-receiving bore by an axial extent such that the plurality of recesses 108 are at least partially received within the bush-receiving bore. That is to say, the bush 100 is preferably inserted into the bush-receiving bore to a depth such that the plurality of recesses 108 are not externally visible. With that said, visibility of at least one of the plurality of recesses 108 could advantageously provide a visual indicator that the correct bush 100 has been fitted. Specifically, if visibility of at least one of the plurality of recesses 108 is expected but after assembly no such recess is visible, the wrong bush may have been used.

In preferred arrangements, the plurality of recesses 108 are configured to receive material of the bush housing which is deformed of therein. That is to say, the plurality of recesses 108 preferably provide an anchoring functionality whereby material of the surrounding bush housing "bites", or moves, into the recesses and thereby secures the bush 100 in position. Put another way, in preferred arrangements material of the bush housing engages the plurality of recesses 108. This will be described in greater detail below.

Figure 5:
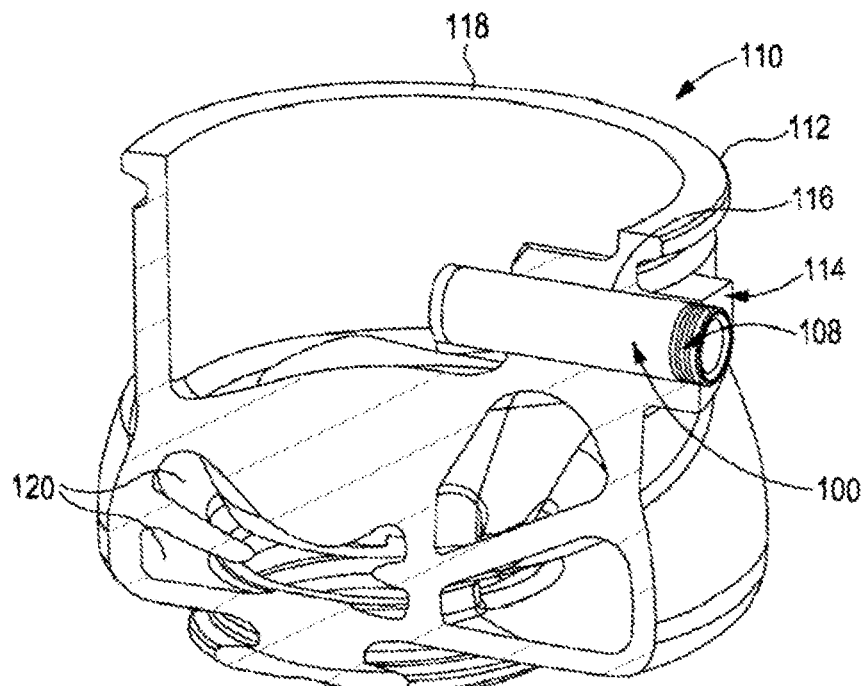
FIG. 5 is a partially cut away perspective view of a turbine housing assembly incorporating the bush of FIG. 4.

FIG. 5 shows a partially cut away perspective view of a turbine housing assembly 110. The turbine housing assembly 110 comprises a turbine housing 112 which has a bush housing indicated generally by the reference numeral 114. The bush housing 114 incorporates a bush-receiving bore 116. The bush 100 is at least partially received within the bush-receiving bore 116.

As will be appreciated from the FIG. 5 illustration, the bush housing 114 is a thickened portion of material relative to the surrounding turbine housing 112. The bush housing 114 may otherwise be referred to as a bush boss, growth or body of some variety. The bush housing 114 receives the bush 100, and also constrains the bush 100. That is to say, the position of the bush 100 is dictated by the bush housing 114, specifically the bush-receiving bore 116 thereof. At least some of the thickened portion of material provided in proximity to the bush housing 114 also facilitates the use of high pressure compressive processes in order to more robustly secure the bush 100 therein. Staking is one such process, and will be described in more detail below.

For reference, a feature which corresponds with the exhaust gas outlet 26 of FIG. 1 is indicated by the reference numeral 118 in FIG. 5.

FIG. 5 shows the turbine housing assembly 110 at its most basic i.e. the combination of the turbine housing 112 and the bush 100. In FIG. 5, the plurality of recesses 108 of the bush 100 are shown as being at least partially received within the bush-receiving bore 116.

In the orientation shown in FIG. 5, the turbine wheel 12 of FIG. 1 would be inserted into an aperture located at the underside of the turbine housing 112. Annular chamber(s) 120 of FIG. 5 also correspond with the turbine chamber 28 in FIG. 1. The illustrated turbine housing assembly 110 forms part of a twin-volute turbine, as indicated by the presence of a plurality of annular chambers 120.

Given the different functions of the turbine housing 112 and the bush 100, typically these components are manufactured from different materials.

The bush 100 is a relatively small component, the internal surface 102 of which is relatively smooth in order to support rotation of a rotatable body received in the bore 106. Furthermore, to support the rotation, and in order to withstand the wear experienced by the internal surface 102, the bush 100 is typically made of a hardwearing material. That is to say, typically the bush 100 is manufactured from a material with a high hardness value e.g. 45-65 or more.

Examples of materials from which the bush 100 may be manufactured include Brico and alloys having a significant proportion of cobalt therein. Brico is a Federal Mogul proprietary sintered material. Due to the relatively small size of the bush 100, more costly materials may be used in its manufacture, without incurring excessive cost.

Unlike the bush 100, the turbine housing 112 is more directly exposed to the flow of exhaust gas. The turbine housing 112 may therefore need to withstand very high temperatures, such as of the order of 800° C. or more, due to the hot exhaust gas which flows therethrough.

Furthermore, the reasonably complicated geometry of the turbine housing 112 dictates, to some extent, the materials available for its manufacture. Another function of the turbine housing 112 is to be able to at least partially contain a turbine blade in a blade-off scenario (without shattering). As such, softer, more ductile materials are often selected (said materials not typically being hardwearing, unlike the bush 100). Turbine housings are typically manufactured from ductile iron (such as D5S), spheroidal graphite and/or cast stainless steel. 303 stainless steel is a further material from which the turbine housing may be manufactured.

More generally, the turbine housing 112 may be manufactured from an alloy with a relatively high proportion of Nickel, to provide temperature resistance, whilst the bush 100 is manufactured from an alloy with a relatively high proportion of cobalt, to provide wear resistance.

It will be appreciated that both the bush 100 and the turbine housing 112 may be manufactured from materials suitable for high temperatures.

An effect of the difference in the materials used to manufacture the bush 100 and the turbine housing 112 is that the respective coefficients of thermal expansion (CTE) for each of these components are often different. Furthermore, in addition to being different, the respective CTE values are often very different from one another. CTE values define how much a material expands per unit of temperature. In other words, the CTE indicates how much a material will deform when heated up. In one specific example, the CTE of the turbine housing may be of the order of 19-21µ/mK, whilst the CTE of the bush may be of the order of 13µ/mK. In this example, it will be appreciated that there is therefore a 'mismatch' (i.e. a difference) of ~7µ/mK, which could lead to an undesirable clearance being present between the bush and bush housing. In other words, the difference in CTE values could lead to the bush becoming loose in the bush-receiving bore (at elevated temperatures).

Typically, the CTE of the turbine housing 112 is higher than that of the bush 100. Put another way, the CTE of the bush 100 is typically lower than that of the turbine housing 112. This means that, in use, the turbine housing 112 expands and contracts to a greater extent than the bush 100.

When the bush 100 is inserted into the bush-receiving bore 116, the bush 100 is typically pressed therein. That is to say, a press, such as a hydraulic press, is often used to impart a significant compressive force upon an end (a contact face) of the bush 100 in order to drive it into the bush-receiving bore 116. Although a variety of fits may be used, as would be understood by the skilled person, an interference fit is typically used in order to retain the bush 100 in the bush-receiving bore 116. An interference fit is a fit in which the shaft is slightly larger than the bore. In other words, an interference fit allows the bush 100 to be received in the bush-receiving bore 116, and retained therein.

Dimensional limits, i.e. tolerances, for the shaft and bore (i.e. the bush 100 and the bush-receiving bore 116 in this example) to achieve various types of fit (i.e. easy running fit, interference fit etc.) are provided by data tables. These tables can therefore be used to determine the range of diameters which the bore/shaft should lie within to achieve an interference fit. Limits and fits may be defined by ISO 286-1: 2010 and ISO 286-2:2010. National standards such as ASME B4.2 also exist.

In one specific example, the bush and bush-receiving bore may be machined to provide an H7/r6 press fit tolerance at 20° C. To achieve this press fit, where the external diameter of the bush is a nominal 14 mm the external diameter should lie within the range of 14.023 mm to 14.034 mm. Correspondingly, when the bush-receiving bore has a nominal diameter of 14 mm, the diameter should lie within the range 14.000 mm to 14.018 mm. This results in a 'worst case' press fit (maximum bore diameter, minimum bush diameter) material engagement of 0.005 mm (5 µm [5 microns]) on diameter at 20° C. This also results in a 'best case' press fit (minimum bore diameter, maximum bush diameter) material engagement of 0.034 mm (34 µm) on diameter at 20° C.

Given that the interference fit referred to above relies upon a tight tolerance between the bush-receiving bore 116 and the outer radius of the bush 100, the aforementioned variation in CTE can lead to the bush 100 becoming loose during use of the turbocharger. That is to say, in use, the turbine housing 112 typically expands by a greater extent than the bush 100. The bush-receiving bore 116 therefore increases in size by a greater extent than the bush 100. Where the interference between the materials is all that holds the bush 100 in place, this can lead to the bush becoming loose in the bush-receiving bore 116. In other words, high temperature operation can mean that the bush 100 is not securely retained in the bush housing 114. The press-fit, or interference fit, between the bush 100 and the bush housing 114 can therefore be lost, or at least loosened, by virtue of a clearance existing, or opening up, between the components.

The example set out above, of a nominal 14 mm diameter bush and bush-receiving bore, can be used to demonstrate the effect of the mismatch of CTE between the bush and turbine housing at operating temperatures. As mentioned above, for a nominal 14 mm diameter, the worst case press fit material engagement is 5 µm on diameter (at 20° C.), whilst the best case press fit material engagement is 34 µm on diameter (at 20° C.). Where the CTE of the turbine housing is 19-21µ/mK, and the CTE of the bush is 13µ/mK, at 720° C. the best case press fit results in a gap of 23 µm on diameter and the worst case press fit results in a gap of 87 µm on diameter. That is to say, due to the mismatch of CTE between bush and turbine housing, at an operating temperature of 720° C. there is a gap between the bush and bush housing (in both best and worst case press fit scenarios), despite there being material engagement between the bush and bush housing at 20° C. In other words, there is a clearance between the external surface of the bush and the internal surface of the bush-receiving bore at higher temperatures. The operating temperature of 720° C. is indicative of the temperature of the turbine housing, in the vicinity of the bush-receiving bore, where gas at a temperature of 850° C. is being expanded across the turbine. The lack of material engagement at higher temperatures can be said to be an example of no secondary restraint of the bush in the bush-receiving bore.

As has been mentioned previously in this document, an effect of the bush 100 becoming loose in the bush-receiving bore 116 is that the bush 100 can move axially within the bush-receiving bore 116. This can lead to misalignment of the wastegate, which is inserted in the bush 100. This can, in turn, lead to low efficiency and other issues during operation of the turbocharger.

It will be appreciated that relative rotation between the bush 100 and the bush housing 114 is not particularly problematic in that the bush 100, specifically the internal surface 102 thereof, supports rotation of a rotatable body received therein. Furthermore, the bush 100 does not constrain the rotation of the wastegate to within certain rotational limits, it merely confines movement of the wastegate to either rotational (or axial) movement. Depending upon the geometry of the recesses in the external surface of the bush, rotation of the bush in the bush-receiving bore may or may not be prevented. For example, annular recesses may allow some rotation to occur. However, axial recesses may substantially prevent rotation. It is desirable that rotation of the bush in the bush-receiving bore is substantially prevented.

Returning to the difference in materials used to manufacture the bush 100 and the turbine housing 112, the materials used to manufacture the bush 100 may mean that it is not possible to deform the bush 100 in the way that the bush housing 114 of the turbine housing 112 is deformed. In particular, the hardwearing nature of the bush 100, specifically the materials used to manufacture the bush 100, make the bush 100 liable to shatter under compressive loading. That is to say, whereas the turbine housing 112 is at least somewhat ductile, the wear-resistant bush 100 is typically comparatively hard, and so brittle (and not ductile). As such, although in theory the bush 100 could be compressed to radially expand material thereof into grooves in the bush-receiving bore 116, in practice this is not possible. This is the reason for plastically deforming the bush housing 114, of the turbine housing 112, and not the bush 100.

Advantageously, the plurality of recesses 108 provide anchoring points into which material of the bush housing 114 can be received. This securely retains the bush 100 in the bush-receiving bore 116, even at high temperatures, despite the difference in CTE between the bush 100 and the turbine housing 112. In other words, the plurality of recesses 108 ensure the bush 100 remains retained in the bush housing 114, and so the wastegate remains correctly aligned therewith.

Figure 6:
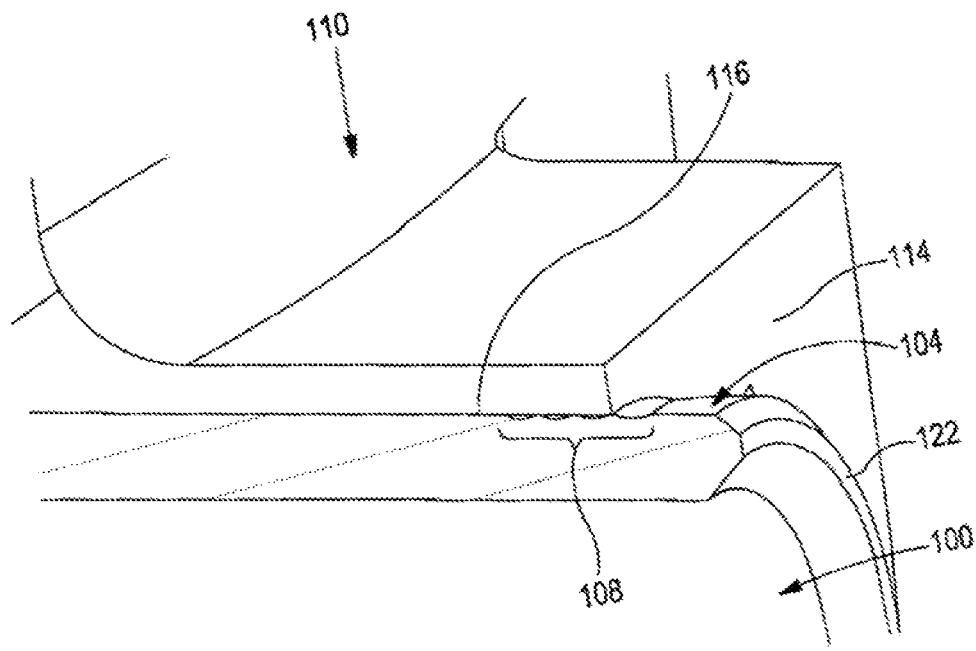
FIG. 6 is a close up partially cut away perspective view of an upper section of a bush housing, as shown in FIG. 5, with the bush of FIG. 4 inserted therein, before a staking operation occurs.

FIG. 6 is a close-up perspective view of the turbine housing assembly 110 of FIG. 5, specifically an upper section of the bush housing 114 thereof. FIG. 6 shows the bush 100 inserted partly within the bush-receiving bore 116. Of note, three of the four recesses in the exterior surface 104 of the bush 100 are received within the bush-receiving bore 116.

FIG. 6 illustrates the bush 100 inserted within the bush-receiving bore 116 before staking occurs. Staking is a manufacturing process involving compression of a component in order to radially expand it, and will be described in more detail below. Because FIG. 6 illustrates the turbine housing assembly 110 before staking occurs, material of the bush housing 114 is not actively engaging the recesses in the external surface 104 of the bush 100. That is to say, in the FIG. 6 arrangement, the bush 100 has merely been pressed into the bush-receiving bore 116. Given that the bush 100 has been pressed into the bush-receiving bore, there is an interference fit between the bush 100 and bush housing 114. As such, the bush housing 114 does engage, to some extent, the external surface of the bush 100 in the FIG. 6. However, importantly, the bush housing 114 does not engage the plurality of recesses received therein.

Visible in FIG. 6 is a contact face 122 of the bush 100. The contact face 122 is a substantially flat, annular face. The contact face 122 provides a surface by which the bush 100 can be pressed into the bush-receiving bore 116. As such, during insertion, it is typically the case that a punch, driven by a press, abuts the contact face 122. It will be appreciated that a variety of geometries of contact face 122 can be used.

Because the FIG. 6 arrangement represents an interference fit between the bush 100 and the bush housing 114, specifically the bush-receiving bore 116 thereof, the bush 100 is retained in the bush-receiving bore 116 as shown in FIG. 6. However, as explained above, during high temperature operation the bush 100 and bush housing 114 deform to different extents. This is owing to the different CTE values of the materials from which the bush 100 and bush housing 114 (or, more generally, turbine housing 112) are manufactured. As such, whilst the "non-staked" arrangement of FIG. 6 may provide ample retention in certain operating conditions, at higher temperatures the bush 100 may not be securely retained within the bush housing 114. Where the bush 100 is not securely retained within the bush housing 114, axial movement of the bush 100 may occur.

In order to prevent, or at least substantially prevent, axial movement of the bush 100 in the bush-receiving bore 116 during use, the applicant has found that plastically deforming the bush housing 114 in proximity to the recesses in the external surface 104 of the bush 100 more robustly retains the bush 100 in position in the bush-receiving bore 116. In other words, the bush housing 114 is deformed such that material engages the recesses in the external surface 104 of the bush 100. This anchors the bush 100 mechanically within the bush-receiving bore 116. As such, axial movement of the bush 100 within the bush-receiving bore 116 is substantially prevented. In turn, the inefficiencies associated with axial movement of the bush 100 in the bush-receiving bore 116, as mentioned above, are eliminated or reduced.

The aforementioned plastic deformation of the bush housing 114 can occur by way of a number of different manufacturing processes. However, preferred methods include staking or swaging.

Staking and swaging are forming processes in which material is plastically deformed under a compressive load. A particularly preferred method is staking, in which significant compressive forces are imparted to a workpiece, or component, using a punch.

Figure 7:
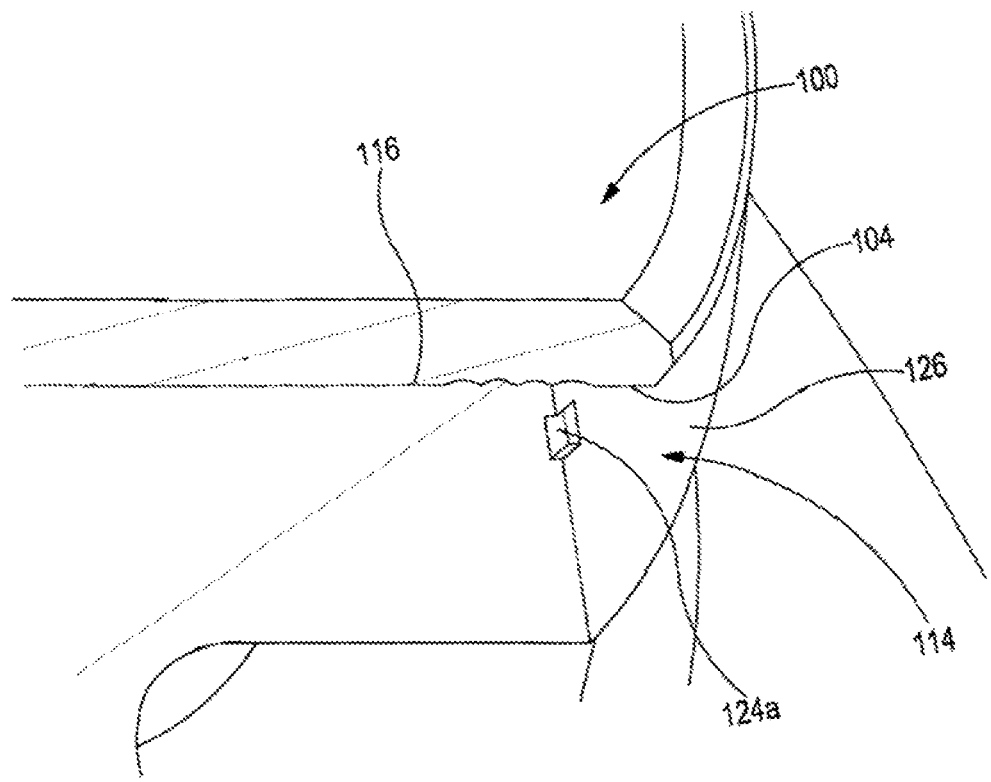
FIG. 7 illustrates the same components as FIG. 6 but a lower, rather than an upper, section of the bush housing is illustrated, and after a staking operation has occurred.

FIG. 7 shows the FIG. 6 arrangement, but a lower section of the bush housing 114, not an upper section. FIG. 7 illustrates the bush housing 114 after staking has occurred. As such, the main difference between the FIG. 7 and FIG. 6 illustrations is that, in FIG. 7, the bush housing 114 incorporates an indentation 124a in an external surface 126 thereof. Furthermore, material of the bush housing 114 in proximity to the recesses of the bush 100 is plastically deformed so as to engage the recesses.

Figure 10:
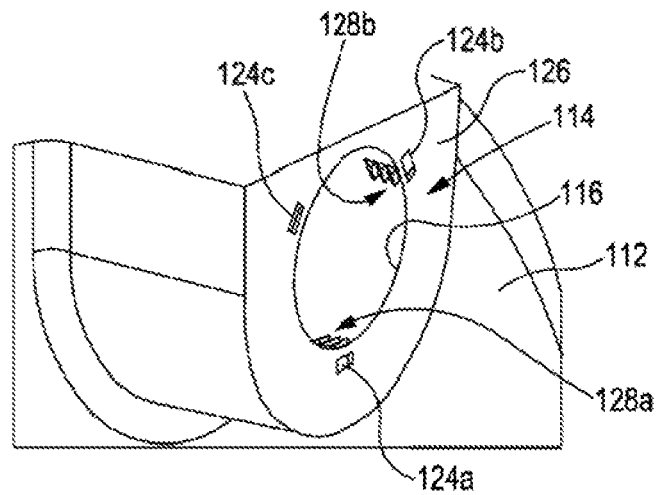
FIG. 10 is a close-up perspective view of the bush housing shown in FIG. 8.
Figure 11:
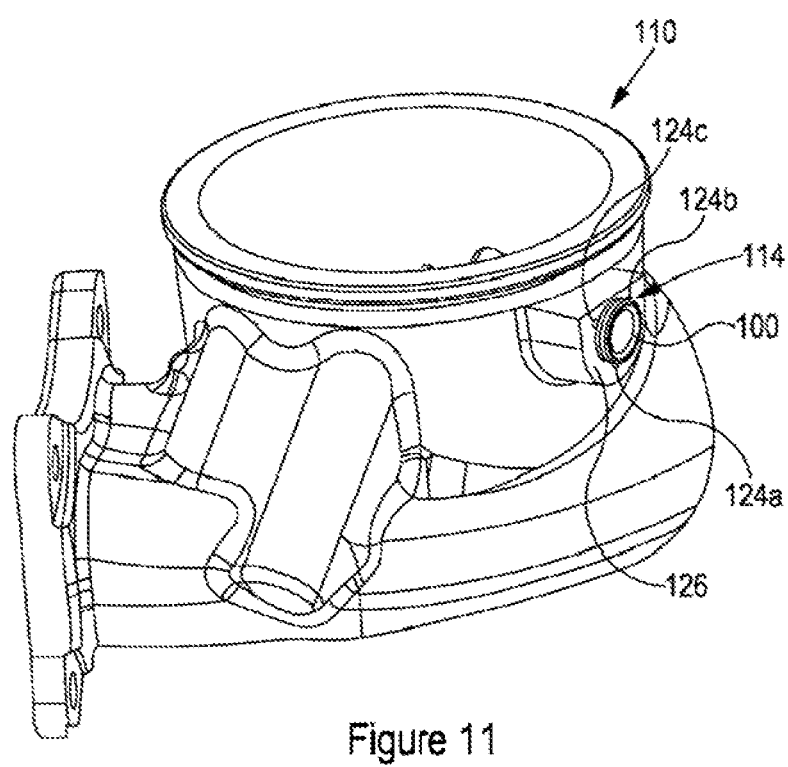
FIG. 11 is a perspective view of the turbine housing assembly of FIG. 5.

The indentation 124a is one of three indentations which are present in a preferred arrangement around the external surface 126 of the bush housing 114 after staking occurs. The preferred three-indentation arrangements are indicated in FIGS. 10 and 11, which will be described later in this document. The indentation 124a is caused by the staking operation. Specifically, the indentation 124a is caused by a staking punch, or a projection thereof, during the staking operation.

It is preferable that the compressive load transmitted during staking is transmitted to the bush housing 114 through a discrete number of load concentrating projections, or pins. This concentrates the imparted force to specific areas of the bush housing 114, and allows the plastic deformation which occurs as a result thereof to be more accurately controlled. Furthermore, by using projections, or pins, in the staking punch, the deformation caused by a given punch driven by a press of a given force will be greater. This is owing to the (relatively) reduced area through which the force is transmitted (i.e. the stress under which the material is placed is comparatively higher), causing more significant deformation of the bush housing 114.

The indentation 124a is therefore indicative that staking has occurred. The presence of the indentation 124a therefore also provides a useful feature in being able to detect whether the claimed method has been carried out. In one example, the indentation may be around 1 mm by 2.5-3 mm in cross-section. The indentation may have a depth of around 1 mm-1.5 mm. In other words, the indentation may have a volume of around 2.5 mm$^3$ to around 4.5 mm$^3$. A volume of indentation of around 3 mm$^3$ to around 4.5 mm$^3$ may be more preferable.

It will be appreciated from FIG. 7 that not all of the plurality of recesses 108 are disposed axially within the bush-receiving bore 116. As such, only the recesses which are disposed axially within the bush-receiving bore 116 can provide the anchoring functionality by virtue of the surrounding material of the bush housing 114 engaging therewith. However, providing more recesses in the external surface 104 of the bush 100 is advantageous in that a single geometry of bush 100 may be used for a variety of different turbine housing 112 geometries. In one example, if recesses were provided along an entire axial extent of the bush 100, then the bush 100 could be inserted within the bush-receiving bore 116 to any range of axial depths. This is advantageous in reducing part proliferation (i.e. the number of parts required for various assemblies), and providing flexibility during manufacture. In other words, a bush 100 incorporating a plurality of recesses 108 is more versatile.

Figure 8:
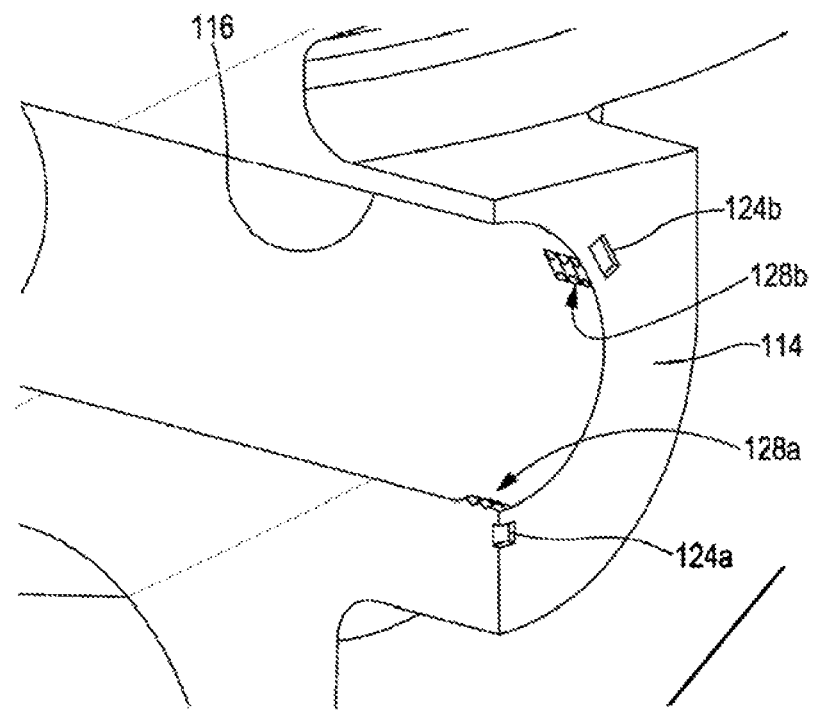
FIG. 8 shows the bush housing of FIG. 7, with the bush removed, after staking has occurred.

FIG. 8 is a zoomed out view of the FIG. 7 arrangement, with the bush 100 having been removed from the bush housing 114. FIG. 8 also shows a second indentation numbered as 124b. In the FIG. 8 arrangement, there would also be a third indentation in an evenly distributed arrangement about the bush-receiving bore 106. However, that is obscured from view in the cross section shown in FIG. 8 (but is visible in FIGS. 10 and 11).

FIG. 8 illustrates the plastic deformation which occurs in the bush housing 114 in the locality of the recesses of the bush 100 due to staking. Said plastic deformation is in the form of a number of ridges, or projections, labelled 128a and 128b respectively. As is also the case for the indentations 124a, 124b, a third "set" of ridges, or projections, would also be present in a portion of the bush housing 114 obscured from view in the FIG. 8 cross-section.

FIG. 8 therefore demonstrates how the bush housing 114 is plastically deformed such that material thereof projects outwardly into the bush-receiving bore 116 and into the recesses of the bush 100. In other words, material of the bush housing 114 engages the recesses in the bush 100. Said engagement more robustly secures, or retains, the bush 100 in position in the bush housing 114. Said engagement secures the bush 100 in the bush housing 114 even at high temperatures, and despite the difference between the CTE values of the materials used to manufacture the turbine housing 110 and the bush 100.

FIG. 8 demonstrates how the ridges 128, 128b which are formed in the bush housing 114 are concentrated to being in the proximity of the indentations 124a, 124b. Put another way, the plastic deformation is concentrated in proximity to the indentations 124a, 124b. More specifically, the plastic deformation is concentrated to being in the proximity of the contacting projections of the staking punch. This logically follows in that the plastic deformation occurs as a result of the compressive force applied during the staking, swaging, or alternative operation. Put very simply, the staking operation can be thought of as forcing the material from the indentations 124a, 124b, into the bush-receiving bore 116 and into engagement with recesses in the bush 100. This could otherwise be described as displacement of material of the bush housing during formation of the indentations 124a, 124b.

It will therefore be appreciated that there is a limited range to the plastic deformation caused by staking. In particular, the plastic deformation will only typically occur near where the projection of the punch contacts the bush housing (e.g. radially inwards from the projection of the punch). The indentations also provide an indication of the extent of plastic deformation caused by staking. For example, indentations which are deeper, or which have a larger cross-sectional area, may indicate that more plastic deformation has occurred as a result of staking. The relative geometry of the indentations can therefore indicate the magnitude of staking, and resulting plastic deformation caused as a result thereof.

It will also be appreciated that, for the punch to contact the bush housing, the bush housing, or a part thereof, should be axially and/or radially exposed. In other words, at least a part of the bush housing should be accessible for contact by the punch.

Figure 9:
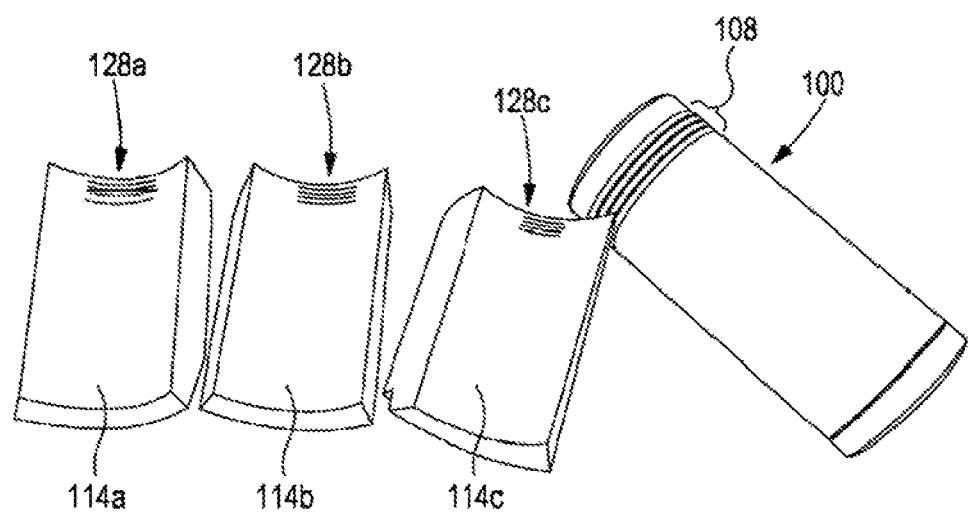
FIG. 9 shows a split-apart bush housing, after mechanical staking has occurred, and with the bush having been removed therefrom, along with the bush.

FIG. 9 illustrates the plastic deformation which occurs in the bush housing 114 as a result of staking. The plastic deformation is, more specifically, of the form of ridges 128a, 128b, 128c. The ridges 128a, 128b, 128c may otherwise be referred to as witness marks, these marks being created, at least in part, when the bush housing 114 is deformed into the bush 100 (specifically the recesses thereof). Other witness marks may be present due to insertion of the bush 100 into the bush housing 114. FIG. 9 also shows the bush 100 and the plurality of recesses 108 therein. FIG. 9 therefore illustrates the deformation which occurs as a result of staking, with constituent pieces 114a-c of the bush housing 114 having been cut apart to release the bush 100. That is to say, when the constituent pieces 114a-c are assembled, they form the bush housing 114. Also of note, once staking has occurred, the only way in which the bush 100 can be removed from the bush housing 114 is by destroying the bush housing 114. That is to say, after staking has occurred, the bush 100 cannot be removed without shearing the indented material.

FIG. 10 is a perspective view which corresponds with that of FIG. 8. However, in FIG. 10 the turbine housing 112 is not cut way as in FIG. 8.

FIG. 10 shows the three indentations 124a, 124b, 124c. The three indentations 124a-c are distributed about the external surface 128 of the bush housing 114. The three indentations 124a-c are distributed in a circumferential arrangement about the bush-receiving bore 116. The three indentations 124a-c present in the FIG. 10 illustration indicate that a punch with three projections was used for staking. It will be appreciated that fewer, or more, projections may be incorporated in the staking punch, so as to leave a corresponding fewer, or more, indentations in the exposed surface 126 of the bush housing 114. In a specific arrangement, rather than using a plurality of projections, the staking punch may incorporate a single annular projection, which may impart compressive force about an entire circumference of the bush housing 114.

FIG. 11 is a perspective view of the turbine housing assembly 110 of FIG. 5.

FIG. 11 therefore shows the bush 100 received within the bush-receiving bore of the bush housing 114. Furthermore, indentations 124*a-c* are visible in the external surface 126 of the bush housing 114.

Although the illustrated embodiment provides the plurality of recesses in the form of annular grooves, there are many other combinations and geometries of recesses which provide the same functionality. To name but some specific examples, one or more annular grooves, axial grooves, helical grooves or recesses may be used, and/or a knurling pattern or other indented geometry may otherwise be used. These features may otherwise be described as radially undercut features. That is to say, they are subsurface features relative to the outer radius of the bush. All that is required is that the external surface of the bush incorporates one or more recesses.

Where more than one recess is incorporated, a repeating pattern, series or array of those recesses may be incorporated. As mentioned above, this provides the advantage that the bush can be inserted to a range of axial depths whilst still providing a recess which can be engaged by material of the bush housing.

Advantageously, the recesses are recessed to a certain depth, relative to the outer radius of the bush, in order to still provide the anchoring effect at high temperatures. Given that prior art bushes are inserted so as to create an inference fit, at least 0.087 mm (approximately 0.09 mm) of material should displace, on the diameter, into the recesses in order to mitigate the loss of the interference fit due to expansion of the bush-receiving bore at high temperatures. The lower limit of 0.087 mm is based upon 0.087 mm of material engagement, on diameter, being the lower limit of a press-fit tolerance. Given the above, it is preferable to have a recess with a depth of at least around 0.04 mm on radius. More preferably the recess is at least around 0.05 mm deep on radius. The minimum depth of recess is determined by a minimum material tolerance (i.e. the lower limit of a particular fit) plus anticipated relative thermal expansion of the materials (bush and bush-receiving bore/bush housing) at operating temperatures. That is to say, the minimum depth of recess should still provide engagement in circumstances where the fit is at a "lower limit" (i.e. relatively little engagement between bush and bush-receiving bore) and when there is relative thermal expansion between the materials during operation. Providing engagement results in the bush remaining retained in the bush-receiving bore, which is desirable for reasons explained throughout this document. The depth of the recesses can be altered based upon the bush and bush housing materials and/or operating temperatures.

The applicant has found that a recess which is recessed to a depth of around 0.2 mm, relative to the outer radius, enables around 0.15 mm of material to displace radially therein. This equates to 0.3 mm of material being displaced therein on diameter. As such, recesses of at least around 0.2 mm are preferred for mitigating the loss of the interference fit between the bush and the bush housing. This is also above the lower limit of 0.087 mm on diameter required in order to mitigate the loss of a press-fit between components, explained above. This results in the press fit being maintained, even at maximum operating temperatures, despite relative thermal expansion between bush and bush housing due to the different materials used to manufacture the bush and bush housing.

Even though the bush incorporates the plurality of recesses, the recesses need not be used if not required. That is to say, if a turbine housing assembly is not going to be used in temperatures which are sufficiently high that staking is required, then the recesses can merely be inserted in the bush housing to create an interference fit in the bush-receiving bore. Staking may only be required if the temperatures in which the turbine housing assembly is to be used are so high that the CTE results in expansion of the bush-receiving bore to such an extent that it risks the loss of interference fit (and thereby movement of the bush in the bush-receiving bore).

The optional staking means that the same design of bush can be used across an entire range of products, reducing part proliferation. Where the recesses are provided along a range of axial positions of the bush, a single design of bush can therefore be used in a variety of different bush housings (and so axial lengths of bush-receiving bores). The combination of these factors may mean a single bush design would be suitable for high temperature use, lower temperature use, and across an entire range of axial lengths of bush-receiving bore. This is highly beneficial in terms of reduced part proliferation, simplicity of assembly and reduced associated costs.

Furthermore, where the bush is to be used in a lower temperature environment, the bush housing may be manufactured from a material which is less temperature resistant. This may reduce the extent to which the CTE values of the bush and bush housing are mismatched. This may, in turn, reduce the likelihood of the bush becoming displaced in the bush housing, or bush-receiving bore thereof.

Where possible, not staking is preferable for reasons of reducing the number of manufacturing processes, and thereby reducing the overall cost of the component.

The bush is preferably between around 15 mm and around 100 mm in length. It will be appreciated that the length of the bush may be linked, to at least some extent, to a corresponding length of the bush-receiving bore. That is to say, in instances where the bush-receiving bore is comparatively long, the bush may also be comparatively long.

The outer radius of the bush is preferably between around 5 mm and around 10 mm. More preferably, the outer radius is between around 7 mm and around 8 mm.

When staking, swaging, or another compression process occurs, the force is preferably applied substantially axially or substantially radially. Where the force is transmitted axially, the force is typically imparted on the exposed surface of the bush housing. This may otherwise be referred to as an end face, or end wall, of the bush housing. Where the force is applied radially, or substantially radially, the force is typically imparted at one or more axial positions along a length of the bush housing. This may be at a plurality of axial positions along the length of the bush housing, which may or may not occur simultaneously.

Where a greater deformation of the bush housing is required, staking can occur at a greater pressure to displace more material. Pressure values are dependent upon a number of variables including bush housing material (specifically hardness and ductility), indent geometry (projected area) and indent depth.

Throughout this document, staking may be interpreted to mean a process which results in mechanical indentation of a component.

In order to manufacture the modified bush, the one or more recesses may be machined from the external surface by machining processes such as milling or turning. This is beneficial in that existing processes can be used to create the one or more recesses.

A further advantage of manufacturing the modified bush by turning is that bushes are already typically turned in order to finish the external surface. This is done so as to ensure the outer radius lies within an acceptable tolerance for insertion in the bush-receiving bore in the bush housing.

The bush is therefore already turned in existing processes in order to provide the necessary outer radius tolerance and, in some instances, a conforming surface finish. As such, forming the one or more recesses by turning represents a further step of manufacture but does not require considerable change to existing manufacturing processes. In particular, the position of the bush on the lathe need not be modified in order to machine the one or more recesses. This could occur directly before or after, or concurrently when, the external surface is turned to provide the outer radius within tolerance limits.

The disclosed retention method is advantageous in using existing material in the assembly process, and not requiring any further material. Furthermore, no additional parts are required.

No modifications are required to the bush-receiving bore. That is to say, the bush-receiving bore can remain unchanged, as a simple through-bore (in some arrangements). The bush-receiving bore can therefore be machined in a single operation. The bush-receiving bore can therefore be machined using standard tooling.

Although the use of the bush has been focused primarily for a turbocharger wastegate, there are many other uses of the bush according to the disclosure. Specific uses include incorporation in valve assemblies such as an exhaust brake valve, exhaust gas recirculation (EGR) valve or butterfly valve, such as for a throttle. The bush according to the disclosure can be applied to any arrangement whereby there is rotation of a part, or linear movement of a part, within a bush.

During a typical lifetime of a product in which the bush is incorporated, it is expected that the bush will not be replaced. That is to say, typically the bush is a permanent fixture in the product, and will not be removed from the bush housing, whether for replacement or repair. In the particular instance of a turbocharger housing assembly incorporating the bush, access to the bush after the turbocharger has been assembled may not be possible. In particular, the linkages may prevent access to the bush such that, even if desired, the bush could not be replaced.

References to the bush being received in the bush housing are intended to specifically refer to the bush being received in the bush-receiving bore. The bush-receiving bore is in the bush housing.

Where material of the bush housing engages the one or more recesses in the external surface of the bush, the engagement may be said to define a labyrinth interface. That is to say, a tortuous path is defined. The labyrinth interface may assist in reducing, or preventing, any flow of gasses through the bush-receiving bore (i.e. leakage gases). These gases may be blowby gases.

If a room temperature press-fit is reduced (i.e. such that there is less nominal material engagement between components at room temperature) a depth of the one or more recesses in the bush may be increased proportionally to compensate at high temperatures (to avoid loosening of the bush in the bush-receiving bore).

The bush-receiving bore may be a reamed bore.

The body received in the bore may be a poppet valve. The bush may be a poppet valve guide.

The described and illustrated embodiment is to be considered as illustrative and not restrictive in character, it being understood that only a preferred embodiment has been shown and described and that all changes and modifications that come within the scope of the disclosures as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims.

The invention claimed is:

1. An assembly comprising:
a bush housing comprising a bush-receiving bore; and
a bush received in the bush-receiving bore, the bush comprising an internal surface and an external surface;
wherein the internal surface defines a bore and is configured to support movement of a body received in the bore;
wherein the external surface defines an outer radius;
wherein the external surface comprises one or more recesses disposed axially within the bush-receiving bore; and
wherein the bush housing is plastically deformed in the locality of the one or more recesses and the plastically deformed material thereby engages the one or more recesses to retain the bush in the bush-receiving bore.

2. The assembly according to claim 1, wherein the one or more recesses comprise one or more of an annular recess, an axial recess, a helical recess, knurling or other indented geometry.

3. The assembly according to claim 2, wherein the one or more recesses is a plurality of annular recesses.

4. The assembly according to claim 1, wherein the one or more recesses span an entire axial extent of the external surface.

5. The assembly according to claim 1, wherein the one or more recesses are recessed to a radial depth of at least around 0.04 mm relative to the outer radius.

6. The assembly according to claim 1, wherein an entire axial extent of the bush is between around 15 mm and around 100 mm.

7. The assembly according to claim 1, wherein the outer radius is between around 5 mm and around 10 mm.

8. A turbine housing assembly comprising a turbine housing and the assembly of claim 1, wherein the turbine housing comprises the bush housing.

9. A bearing assembly comprising the assembly according to claim 1 and a rotatable body received in the bore.

10. A turbine housing assembly according to claim 8, further comprising a rotatable body received in the bore, wherein the rotatable body is a shaft which forms part of a wastegate.

11. A turbocharger comprising:
a compressor comprising a compressor housing and a compressor impeller;
a turbine comprising a turbine wheel and the turbine housing assembly of claim 9; and
a shaft connected to both the compressor impeller and the turbine wheel, such that rotation of the turbine wheel is configured to drive rotation of the compressor impeller.

12. A valve assembly comprising the assembly of claim 1.

13. A method of inserting a bush into a bush housing, the method comprising the steps of:
  i) aligning the bush with a bush-receiving bore of the bush housing;
  ii) urging the bush into the bush-receiving bore such that one or more recesses in an external surface of the bush are disposed within the bush-receiving bore; and
  iii) applying a compressive force to compress the bush housing such that the bush housing is plastically deformed in the locality of the one or more recesses and the plastically deformed material thereby engages the one or more recesses.

14. The method according to claim 13, wherein the application of force to compress the bush housing is in a substantially axial direction.

15. The method according to claim 14, wherein the force is applied to an external surface of the bush housing.

16. The method according to claim 13, wherein the application of force to compress the bush housing is in a substantially radial direction.

17. The method according to claim 13, wherein the force is applied by a staking process.

18. An assembly comprising a bush received in a bush-receiving bore of a bush housing, the assembly being obtained by the method of:
  i) aligning the bush with the bush-receiving bore;
  ii) urging the bush into the bush-receiving bore such that one or more recesses in an external surface of the bush are disposed within the bush-receiving bore; and
  iii) applying a compressive force to compress the bush housing such that the bush housing is plastically deformed in the locality of the one or more recesses and the plastically deformed material thereby engages the one or more recesses;
  wherein the bush housing comprises one or more indentations in an external surface of the bush housing, the one or more indentations being formed during step (iii).

19. The assembly according to claim 1, wherein the bush housing comprises one or more indentations in an external surface of the bush housing.

20. The method according to claim 13, wherein the bush housing comprises one or more indentations in an external surface of the bush housing, the one or more indentations being formed during step (iii).

\* \* \* \* \*